US008521886B2

(12) United States Patent
Wang et al.

(10) Patent No.: US 8,521,886 B2
(45) Date of Patent: Aug. 27, 2013

(54) METHODS AND APPARATUS FOR DETERMINING AND/OR USING A COMMUNICATIONS MODE

(75) Inventors: Hua Wang, Bridgewater, NJ (US);
Shailesh Patil, Bridgewater, NJ (US);
Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 13/008,968

(22) Filed: Jan. 19, 2011

(65) Prior Publication Data

US 2012/0185605 A1 Jul. 19, 2012

(51) Int. Cl.
*G06F 15/16* (2006.01)

(52) U.S. Cl.
USPC ........... 709/227; 709/228; 709/229; 370/229; 370/230

(58) Field of Classification Search
None
See application file for complete search history.

(56) References Cited

U.S. PATENT DOCUMENTS

| 2007/0111742 | A1 | 5/2007 | Zhang et al. |
| 2007/0129076 | A1* | 6/2007 | Cho et al. .................. 455/436 |
| 2009/0011770 | A1 | 1/2009 | Jung et al. |
| 2009/0016225 | A1 | 1/2009 | Laroia et al. |
| 2009/0023460 | A1* | 1/2009 | Cho et al. .................. 455/456.2 |
| 2009/0034447 | A1* | 2/2009 | Yu et al. .................... 370/315 |
| 2010/0022190 | A1 | 1/2010 | Laroia et al. |
| 2010/0169498 | A1 | 7/2010 | Palanki et al. |
| 2010/0261469 | A1 | 10/2010 | Ribeiro et al. |

OTHER PUBLICATIONS

Hung-Yun Hsieh, "On Using Peer-to-Peer Communication in Cellular Wireless Data Networks", IEEE Transactions on Mobile Computing, vol. 3, No. 1, Jan.-Mar. 2004, pp. 57-72.
International Search Report and Written Opinion—PCT/US2012/021776—ISA/EPO—Mar. 21, 2012.

* cited by examiner

*Primary Examiner* — Djenane Bayard
(74) *Attorney, Agent, or Firm* — James K. O'Hare

(57) ABSTRACT

Methods and apparatus for determining whether two or more communications devices, e.g., wireless terminals, in a communications system should communicate using direct peer to peer communications or via one or more infrastructure elements, e.g., base stations, are described. The determination whether a given pair of communications devices should communicate using direct peer to peer communications, rather than via the infrastructure element(s), is determined by a control device. The control device instructs various wireless terminals to make various signal measurements and/or transmit signals to be measured. Based on the signal measurements the control device estimates interference caused by the direct peer to peer link to the existing communications devices, the direct peer to peer link channel quality and/or interference caused to such a direct peer to peer link by existing communications devices which are communicating using peer to peer signaling and makes a mode decision based on such information.

20 Claims, 9 Drawing Sheets

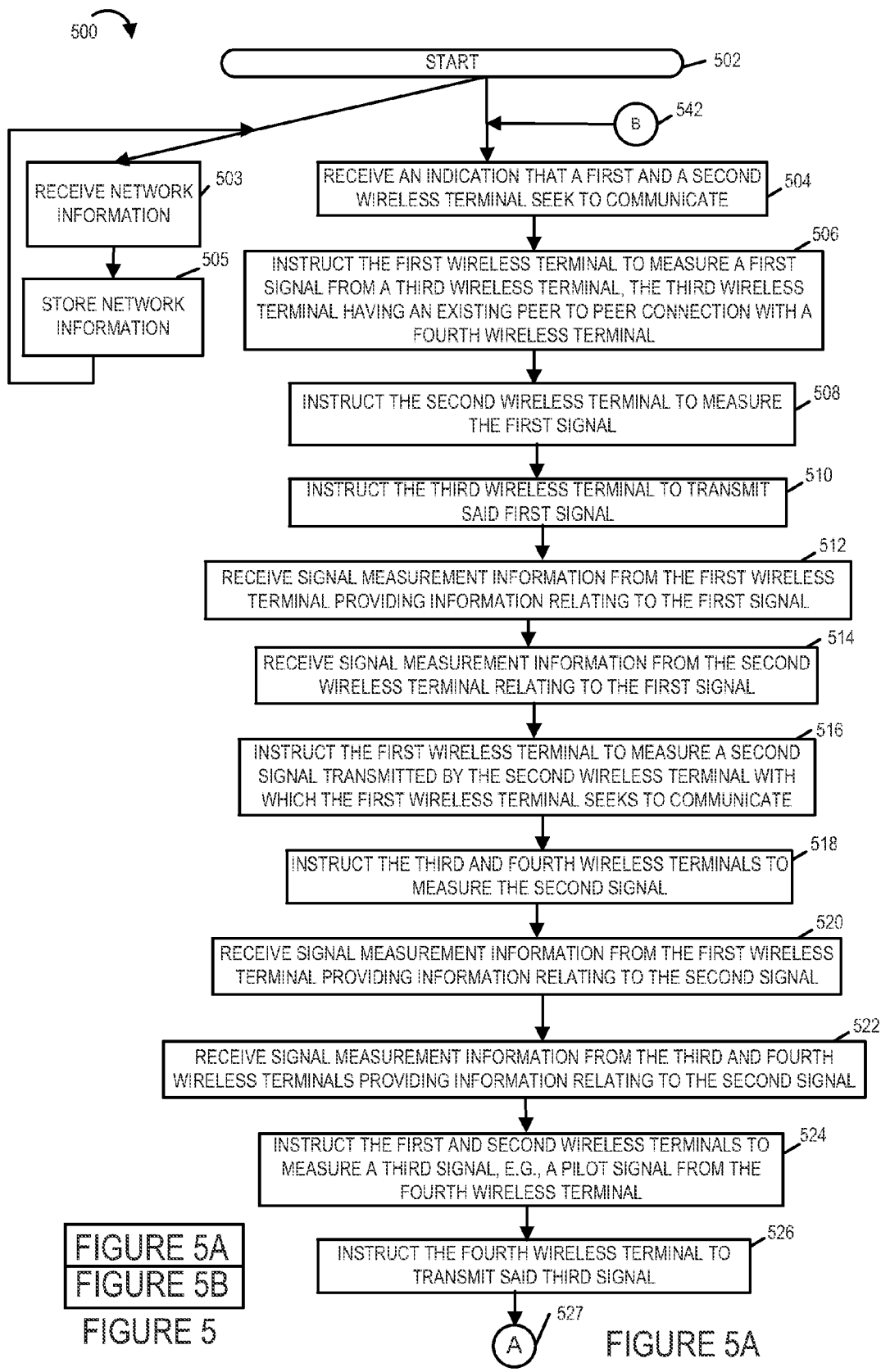

METHODS AND APPARATUS FOR DETERMINING AND/OR USING A COMMUNICATIONS MODE

FIELD

Various embodiments relate to wireless communications methods and apparatus and, more particularly, to wireless communications methods and apparatus for determining whether two or more devices should communicate using direct peer to peer communications or via network infrastructure, e.g., such as via a base station.

BACKGROUND

Communications systems and devices are becoming increasingly diverse with new technological advancements. Communications devices are now able to support various different communications technologies and protocols. Various communications devices can operate in a communications system, e.g., network, and may communicate with each other, e.g., using direct peer to peer communications or using an infrastructure element, e.g., with communication between the devices being achieved with signals being communicated via a base station.

Generally in a wireless wide area network (WWAN) communications system, communications between two or more mobile devices is facilitated by one or more intermediate base stations, e.g., through uplink/downlink channels between mobile devices and the base stations. However at times, the loading conditions on one or more infrastructure elements, e.g., at a base station serving a plurality of communications devices, may become excessive decreasing communications quality.

In some scenarios it would be desirable to allow some traffic to avoid use of the network infrastructure thereby reducing the load on such elements. One way to do this is to allow devices seeking to communicate to use a direct link, e.g., a peer to peer communications link, to communicate. Such an approach can be particularly beneficial when two devices seeking to communicate are in each others vicinity and the quality of a direct peer to peer connection is reasonably good. Such an approach may serve to reduce the traffic load on base stations.

While allowing some devices to communicate using peer to peer signals can be advantageous under certain conditions, the peer to peer communications may create interference to existing peer to peer communications sessions and/or other interference. Accordingly, while peer to peer communications can be beneficial from a system perspective for communications between some devices and under some conditions, it might be undesirable under other circumstances.

In view of the above discussion it should be appreciated that there is a need for methods and/or apparatus for determining how, at a given time, two or more mobile communications devices should communicate, e.g., either using a direct peer to peer connection or via an infrastructure element such as a base station. While not required for all embodiments, it may be desirable if in at least some embodiments the decision of whether infrastructure or peer to peer communications should be used for a particular communications session took into consideration the interference that peer to peer communications might have on already ongoing peer to peer communications.

SUMMARY

Methods and apparatus for determining whether two or more communications devices, e.g., wireless terminals, in a communications system should communicate using direct peer to peer communications or via one or more infrastructure elements, e.g., base stations, at a given time, are described. In at least some exemplary embodiments a communications device, e.g., wireless terminal, can communicate with another communications device directly, e.g., using peer to peer signaling, or via network infrastructure elements.

In some embodiments, determination whether a given pair of communications devices should communicate using direct peer to peer communications, rather than via the infrastructure element(s), is determined by a control device. The control devices instructs various wireless terminals to make various signal measurements and/or transmit signals to be measured.

Based on the signal measurements the control device can, and in some embodiments does, estimate the impact allowing the devices seeking to communicate using peer to peer signaling will interfere with one or more already ongoing peer to peer communications sessions. Thus, in at least one embodiment, the decision by the control device as to what mode of operation should be used for a particular communications session is based on the expected interference to another peer to peer communications session. Interference to other devices such as base stations may also be taken into consideration. The decision of whether a communications session should use infrastructure mode communication or peer to peer mode communication is determined, in some embodiments, based on a comparison of the expected effects of the two different modes and selection of the mode which is most effective from the perspective of minimizing interference and/or maximizing overall system data throughput via a combination of peer to peer and infrastructure communications sessions. The mode of operation determined by the control device may, and normally is, communicated to the devices seeking to initiate a communications session.

While described in the context of initiating a communications session, the methods and apparatus described herein can also be used to determine when a mode of communication being used for an ongoing session should be changed to improve system performance, e.g., in response to a change in conditions or a change in the communications sessions which are ongoing in a particular area.

The control device may be included in, e.g., a mobility management entity, a control server, or another device such as a base station. In some embodiments the control device determines what mode of communications should be used for a communication session based on one or more factors including, for example, channel quality of a possible direct peer to peer link between the pair of communications devices, interference caused to such a direct peer to peer link by communications devices which are already communicating using peer to peer signaling, and interference which may be caused to an existing peer to peer communications link.

Thus, in accordance with at least one feature, a control device takes into consideration the interference which may be caused from a pair of communications devices in an ongoing peer to peer communications session to devices seeking to communicate using peer to peer signaling or infrastructure mode signaling.

The decision made by the control device may be communicated to devices which are seeking to communicate or to communications devices which are being asked to switch there mode of communication based on a decision that a different mode would be preferable. For example, devices using infrastructure mode communication may be instructed to switch to direct peer to peer communications to reduce the load on a base station when it is determined by the control device that such a change would be beneficial to overall system throughput and/or from an interference perspective.

In some embodiments, the decision regarding a mode of communication to be used is communicated to one of a pair of communications devices to which the decision corresponds, and the informed device communicates the decision to the other device, e.g., via a peer to peer signal.

Among the described methods and apparatus are methods and apparatus for operating a control device, e.g., network node. One exemplary method of operating a control device comprises: instructing a first wireless terminal to measure a first signal from a third wireless terminal having an existing peer to peer connection with a fourth wireless terminal; instructing said first wireless terminal to measure a second signal transmitted by a second wireless terminal with which said first wireless terminal seeks to communicate; receiving signal measurement information from said first wireless terminal providing information relating to said first and second signals; and making a decision as to whether said first and second wireless terminals should communicate using a peer to peer connection or via a base station based on said received signal measurement information relating to said first and second signals.

One exemplary control device comprises at least one processor configured to: instruct a first wireless terminal to measure a first signal from a third wireless terminal having an existing peer to peer connection with a fourth wireless terminal; instruct said first wireless terminal to measure a second signal transmitted by a second wireless terminal with which said first wireless terminal seeks to communicate; receive signal measurement information from said first wireless terminal providing information relating to said first and second signals; and make a decision as to whether said first and second wireless terminals should communicate using a peer to peer connection or via a base station based on said received signal measurement information relating to said first and second signals. The control device may, and in some embodiments does, include a memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5A, which is a first part of FIG. 5, is a flowchart illustrating an exemplary method of operating a control device, in accordance with one exemplary embodiment.

FIG. 5, illustrates a second part of the exemplary method of operating a control device in accordance with one exemplary embodiment.

DETAILED DESCRIPTION

Figure 1:
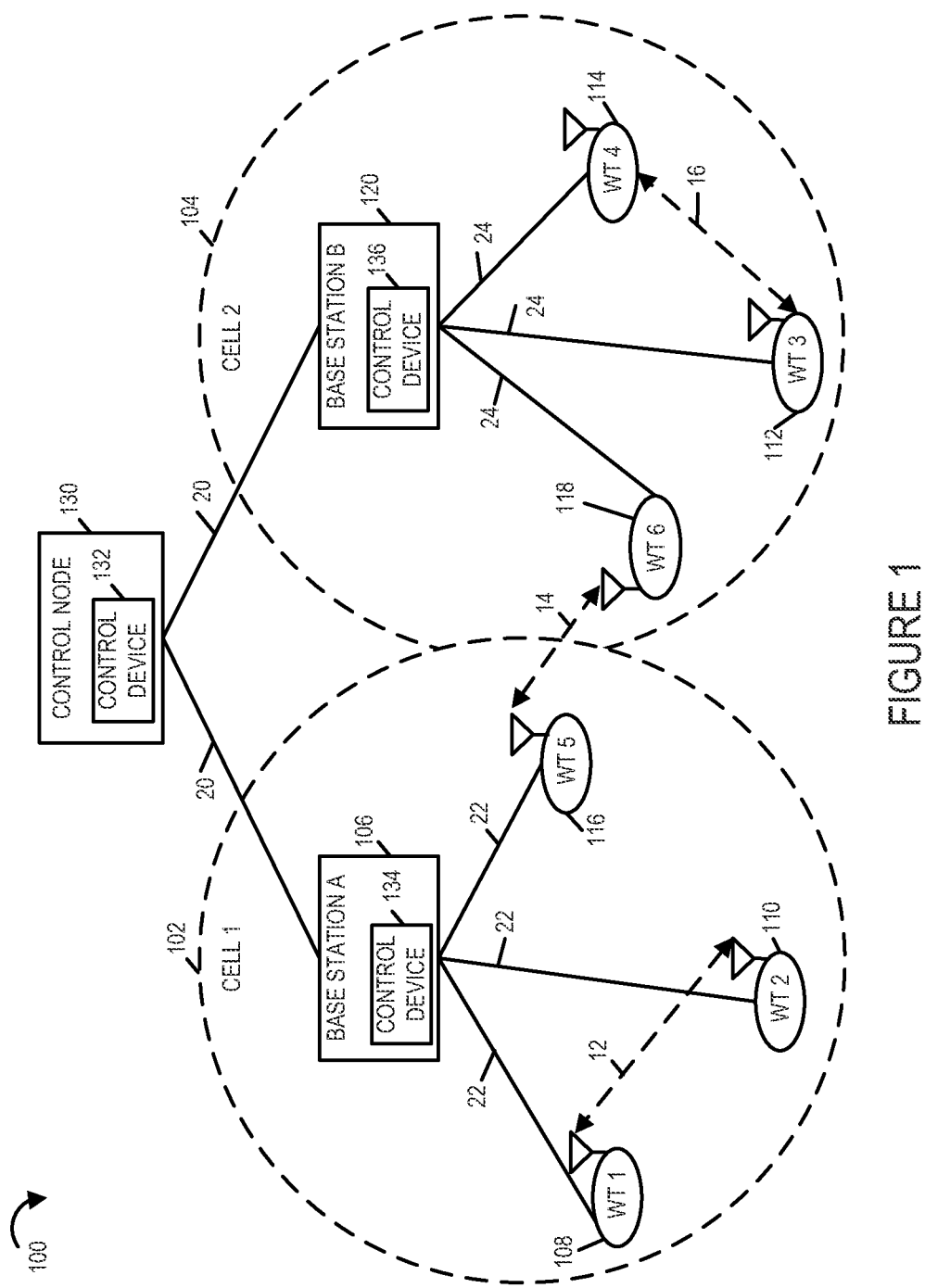
FIG. 1 illustrates an exemplary wireless communications system, and communications between various devices in the system in accordance with one embodiment.

FIG. 1 illustrates an exemplary communications system 100 in accordance with an exemplary embodiment. Communications system 100 includes two cells, e.g., cell 1 102 including a base station A 106, and cell 2 104 including second base station B 120, and a communications control node 130 coupled to base stations 106, 120 via link 20, e.g., a network link. The coverage area of a given base station is represented by the cell in which the given base station is located. Thus, for purposes of discussion cell 1 102 includes the base station coverage area corresponding to base station A 106 will be referred to as a cell. Each of the cells included in the system 100 include a plurality of communications devices. In the illustrated embodiment cell 1 102 includes wireless terminals WT 1 108, WT 2 110 and WT 5 116 while cell 2 104 includes wireless terminals WT 3 112, WT 4 114 and WT 6 118. Some wireless devices in system 100, e.g., WT 1 108, WT 2 110, WT 3 112, WT 4 114, WT 5 116 and WT 6 118, are mobile wireless devices, e.g., handheld mobile devices. Each of the base stations 106, 120, as well as the control node 130, includes a control device. The control node 130 includes control device 132, base station A 106 includes control device 134, and base station B 120 includes control device 136. Although not shown, in some embodiments the base stations 106, 120 are connected together via a backhaul link.

In accordance with one feature of various embodiments, the communications devices, e.g., wireless terminals WT 1 108, WT 2 110, WT 5 116, WT 3 112, WT 4 114 and WT 6 118, support direct peer to peer communications, e.g., wireless terminals may communicate directly without having to communicate through another device or an infrastructure element such as base station A 106, and also support communications through the infrastructure elements such as base station A 106 and/or base station B 120. In WWAN, communications between wireless terminals go through communications links between various wireless terminals and the base stations such as links 22, and 24 shown in FIG. 1. Each of the base stations 106, 120 serves as the attachment point for the communications devices in the corresponding cells and facilitate communications between the communications devices associated with it. In accordance with one aspect when two or more communications devices, e.g., WT 1 108, WT 2 110, that wish to communicate are in the vicinity of each other, then a direct peer to peer link, e.g., dashed link 12, can be established between WT 1 108 and WT 2 110 for communication. One advantage of enabling direct peer to peer communications in such a scenario is off loading of the serving base station 106, i.e., reduction of traffic at base station 106.

Similarly, as shown in FIG. 1, the wireless terminal WT 3 112 can communicate with wireless terminal WT 4 114 through intermediate base station 120. Since WT 3 112 and WT 4 114 are served by the same base station 120, the base station B 120 may know that WT 3 112 and WT 4 114 may be in the vicinity of each other and a direct peer to peer communications as illustrated by the dashed link 16 can be enabled if desirable, for example, to reduce base station B 120 loading and/or when channel quality of the direct peer to peer link between is good or when one or more conditions are satisfied as will be discussed in greater detail below. For Inter-cell communications where the participating wireless terminals are in different nearby cells, a direct peer to peer communications link is still a possibility. This is illustrated in the FIG. 1 example where WT 5 116 and WT 6 118 may communicate using direct peer to peer communications illustrated by dashed link 14. The base stations 106, 120 can cooperate to determine that the two wireless terminals 116, 118 are in nearby cells and in vicinity of each other.

In various embodiments the decision of whether or not communications between two or more devices in system 100 should occur via a direct peer to peer link or through an infrastructure element such as base stations 106, 120 is made by a control device, e.g., such as the one included in the base stations 106, 120 and the control node 130. The decision making control can be attributed to the control node 130, or the base station 106 depending on, e.g., design preference and/or system architecture. Thus in some embodiments the decision making and control operations are implemented by a base station, e.g., base stations 106, 120, while in some other embodiments decision making and control operations may be implemented by the control node 130. In various embodiments the decision is based on one or more factors including direct peer to peer link channel quality, interference caused to such a direct peer to peer link by existing communications devices which are communicating using peer to peer signaling, and interference caused by the direct peer to peer link to the existing communications devices which are already communicating using peer to peer signaling. In the FIG. 1 example, decision making is performed by the control node 130. In some embodiments the control node 130 receives information from multiple cells via the respective base stations regarding, e.g., base station traffic and loading conditions, channel quality of one or more possible peer to peer links between communications devices, interference cost estimate regarding interference caused from devices having existing peer to peer links to the possible new direct peer to peer links. The received information is used in some embodiments by the control node 130 in making a rather well informed decision whether two or more communications devices should be allowed to establish and communicate via the possible direct peer to peer links.

Figure 2:
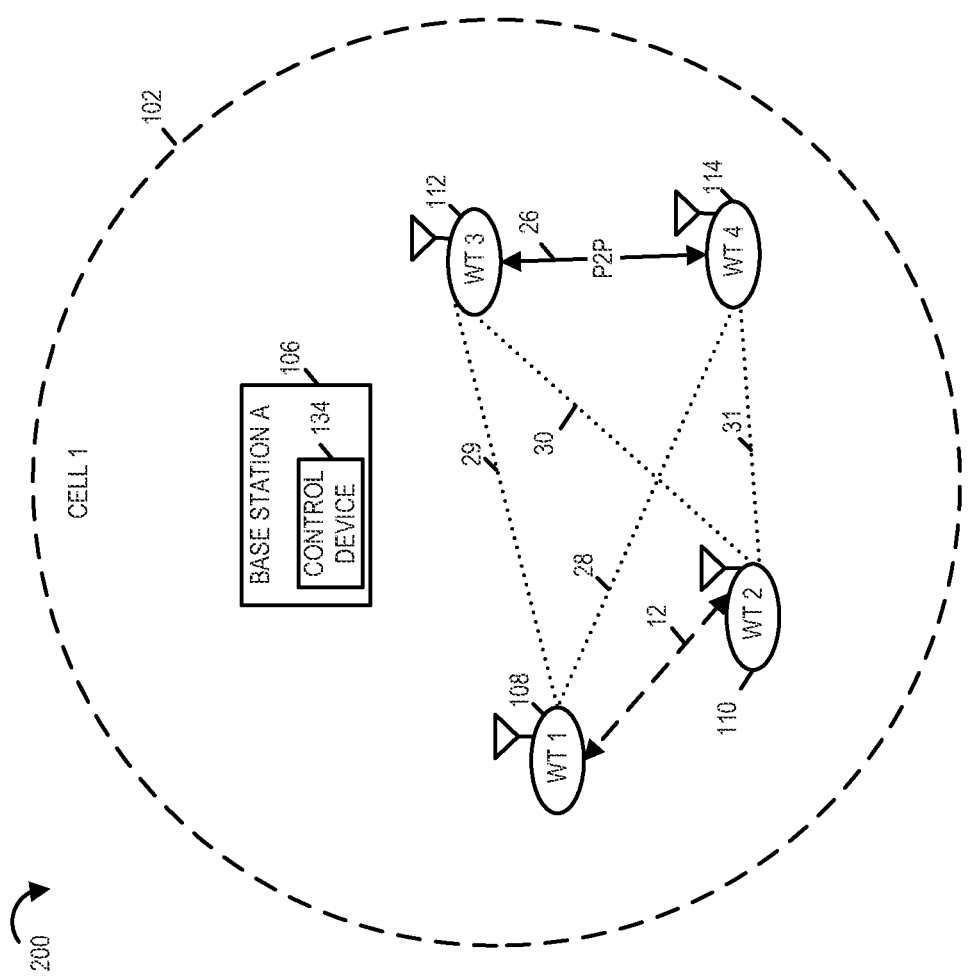
FIG. 2 illustrates an example showing communications between devices in the communications system shown in FIG. 1 in accordance with one embodiment.

FIG. 2 illustrates an exemplary communications system 200 implemented in accordance with another exemplary embodiment. It should be appreciated that for convenience in illustration, same reference numbers have been used to identify various elements in the system 200 as were used to identify the same elements in FIG. 1 example. Communications system 200 includes a single cell 102 with base station A 106 and WT 1 108, WT 2 110, WT 3 112, WT 4 114 as shown. The base station A 106 includes the control device 134. FIG. 2 illustrates an example where a pair of communications devices, e.g. WT 3 112 and WT 4 114, communicate through a direct peer to peer communications link 26, and a decision is to be made as to whether another pair of devices WT 1 108 and WT 2 110 should be allowed to communicate using a direct peer to peer communications or via the base station A 106. In the FIG. 2 example, since the wireless terminals WT 1 108, WT 2 110, WT 3 112, WT 4 114 are in the same cell, the base station A 106 itself can, and in this embodiment does, handle the decision making process. Thus in the illustrated example, the control device 134 controls the base station 106 to implement one or more control operations involved in the decision making process for deciding whether WT 1 108 and WT 2 110 should be allowed to communicate using a direct peer to peer communications. However in some embodiments in cases of inter-cell communications, such as the one between WT 5 116 and WT 6 118 illustrated in the FIG. 1 example, the decision is made by the control node 130.

In accordance with one aspect of some embodiments, the decision is based on one or more factors including the information about the quality of the possible peer to peer link illustrated by dashed link 12, and the cross interference between the peer to peer links 12 and 26. The cross interference is illustrated in the example using dotted lines 28 and 30. The cross interference 28, 29, 30, and 31 represents the interference caused to the possible new direct peer to peer link 12 by communications between WT 3 112 and WT 4 114 which are communicating using peer to peer signaling, and interference caused by the possible peer to peer link 12 to the existing peer to peer link 26 between WT 3 112 and WT 4 114.

In one exemplary embodiment in order to obtain the possible peer to peer link 12 quality information and the cross interference information, the base station A 106 (control device 134) instructs the wireless terminals WT 1 108 and WT 2 110 to listen and measure the interference caused by WT 3 112 and WT 4 114 with the existing peer to peer link 26, and to figure out the interference that WT 1 108 and WT 2 110 may cause to the WT 3 112 and WT 4 114 peer to peer link 26. The base station A 106 instructs the WT 1 108 and WT 2 110 to report this back to the base station A 106. Using the received measurement information from the wireless terminals the base station 106 decides whether or not to allow the new direct peer to peer link 12. An exemplary method to obtain the above discussed information at the base station A 106 is illustrated in greater detail in FIG. 3 example.

Figure 3:
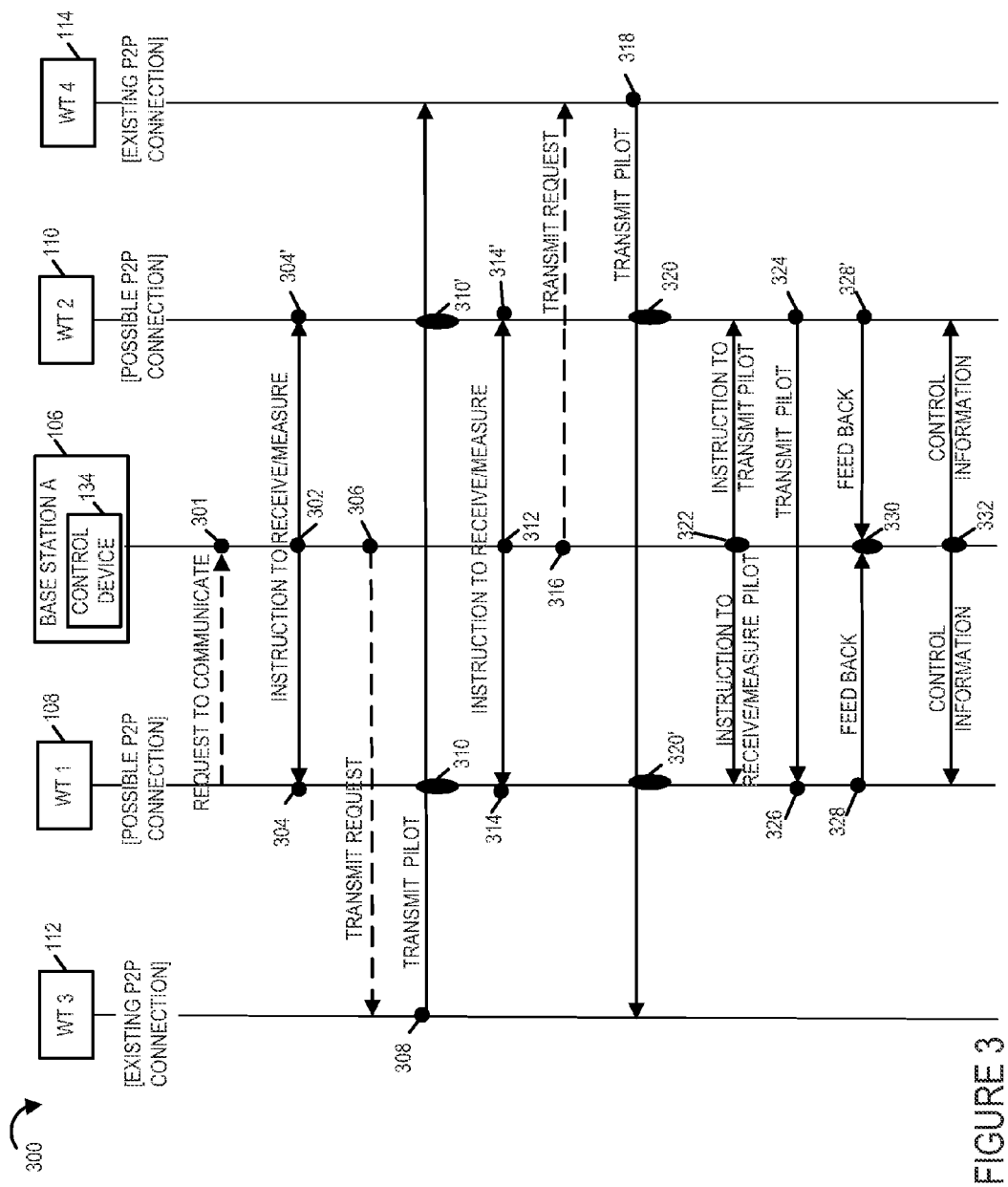
FIG. 3 illustrates exemplary signaling exchange between communication devices and steps associated with an exemplary method that facilitates determining whether communications devices should communicate using peer to peer communications or via infrastructure, in accordance with one exemplary embodiment.

FIG. 3 is a drawing 300 illustrating the steps and associated signaling used in one exemplary embodiment where a control device, e.g., control device 134 included in base station A 106, determines whether or not two or more communications devices, e.g., WT 1 108 and WT 2 110, should communicate using direct peer to peer communications or through an intermediate base station. To facilitate better understanding of the exemplary process illustrated in FIG. 3, consider the system shown in FIG. 2. Various devices participating in the exemplary method illustrated in FIG. 3 are shown on the top, and include wireless terminals WT 1 108 and WT 2 110 which are seeking to communicate, the base station A 106, and WT 3 112 and WT 4 114 which are communicating with each other through an existing direct peer to peer communications link. One exemplary way to determine and decide whether WT 1 108 and WT 2 110 should be allowed to communicate using direct peer to peer communications is discussed below. Various signals, messages that may be exchanged between devices are shown using arrows.

In FIG. 3 example the process is initiated by the base station A 106 including the control device 134, e.g., upon receiving an indication that WT 1 108 and WT 2 110 seek to communicate. In some embodiments the process may even be triggered by traffic over loading at the base station A 106, e.g., over a predetermined threshold, which makes it desirable to off-load the base station traffic by enabling at least some direct peer to peer communications links between devices which are communicating through the base station A 106. In step 301 the base station A 106 receives a request from WT 1 108 (or WT 2 110) indicating that the WT 1 108 and WT 2 110 seek to communicate. However the step of receiving the request to communicate is optional. In step 302 the base station sends control signals to WT 1 108 and WT 2 110 instructing the wireless terminals to measure a first signal, e.g., a pilot signal, from the WT 3 112 having an existing peer to peer connection with the WT 4 114. The control signals sent by the base station 106 may be sent individually to WT 1 108 and WT 2 110. WT 1 108 and WT 2 110 receive the control signals in processing steps 304 and 304' respectively and wait to receive the first pilot signal.

In step 306 the base station 106 optionally sends a control signal to WT 3 112 requesting WT 3 112 to transmit a pilot signal, i.e., the first pilot signal so that WT 1 108 and WT 2 110 can measure the interference caused by WT 3 112. In step 308 the WT 3 112 transmits the first pilot signal. Following the transmission of the pilot signal from the WT 3 112, in steps 310, 310' the first and second wireless terminals WT 1 108, WT 2 110, which are listening for the first pilot signal, perform measurements on the first pilot signal, e.g., signal power level measurement. The signal measurements performed on the pilot signal from WT 3 112 can be used to estimate the cross interference caused by WT 3 112 to the possible peer to peer link between WT 1 108 and WT 2 110. The signal measurements may be, and in some embodiments are, temporarily stored by WT 1 108 and WT 2 110 for sending to the base station 106 (control device 134). In the event when the base station 106 does not specifically request WT 3 112 to transmit the pilot signal, the wireless terminals WT 1 108, WT 2 110 may simply monitor the data channel used by the WT 3 112 and WT 4 114 to perform signal measurement on data signals transmitted by WT 3 112.

In step 312 the base station sends control signals to WT 1 108 and WT 2 110 instructing the wireless terminals to measure a signal, e.g., a pilot signal, from the WT 4 114 having an existing peer to peer connection with the WT 3 112. WT 1 108 and WT 2 110 receive the control signals in processing steps 314 and 314' respectively and wait to receive the pilot signal transmitted by WT 4 114. In step 316 the base station 106 optionally sends a control signal to WT 4 114 requesting WT 4 114 to transmit a pilot signal so that WT 1 108 and WT 2 110 can measure the interference caused by WT 4 114. In step 318 WT 4 114 transmits the pilot signal. Following the transmission of the pilot signal from the WT 4 114, in steps 320', 320 the first and second wireless terminals WT 1 108, WT 2 110 which are monitoring for the pilot signal from WT 4 114 receive and perform measurements on the pilot signal. The signal measurements may be, and in some embodiments are, stored by WT 1 108 and WT 2 110 for sending to the base station 106. Further, in some embodiments by performing inverse power scaling operation the WT 1 108 and WT 2 110 can also determine the interference that they may cause to the wireless terminals WT 3 112 and WT 4 114 which are communicating using an existing peer to peer connection. This determined interference estimate, that may be caused to the WT 3 112 and WT 4 114 may, and in some embodiments is, stored along with the signal measurement information for sending to the base station 106 (control device 134).

In step 322 the base station 106 sends a control signal to the first wireless terminal WT 1 108 instructing WT 1 108 to measure a pilot signal from the second wireless terminal WT 2 110. Further, the base station 106 sends a control signal to the second wireless terminal WT 2 110 to transmit a pilot signal so that WT 1 108 can perform signal measurement and estimate peer to peer link quality. In step 324 the second wireless terminal WT 2 110 transmits the pilot signal. The first wireless terminal WT 1 108 receives the pilot signal from WT 2 110 and performs signal measurements in step 326.

In steps 328 and 328' the first and second wireless terminals WT 1 108 and WT 2 110 respectively send individual feedback reports to the base station 106. The feedback reports include the signal measurements made individually by WT 1 108 and WT 2 110 from the pilot signals transmitted by various devices as discussed above. The feedback report in some embodiments further includes interference estimates generated using the signal measurements by WT 1 108 and WT 2 110. The base station 106 receives the feedback reports from the wireless terminals in step 330.

Following the receipt of feedback reports, the base station 106 (control device 134) makes a decision as to whether the first and second wireless terminals WT 1 108 and WT 2 110 should communicate using a peer to peer connection or via the infrastructure base station 106 based on the signal measurement information and/or the interference estimates received in the feedback reports. In some embodiments the feedback reports are forwarded to the control node 130, e.g., as in FIG. 1 example, to make the decision whether the communications devices should communicate using a peer to peer connection or via one or more intermediate base stations. After the decision has been made, in step 332 the base station 106 sends control information to the first and second wireless terminals WT 1 108 and WT 2 110, indicating whether they should communicate using direct peer to peer communications or via the base station 106.

One embodiment involving making a decision as to whether infrastructure mode or peer to peer mode communication should be used for a new connection, e.g., between WT 1 108 and WT 2 110, in which interference which will be caused to an existing peer to peer connection, e.g., existing peer to peer link between WT 3 112 and WT 4 114, is considered, has been described in the context of the FIG. 3 embodiment. It should be appreciated that additional interference signal measurements beyond those described with regard to FIG. 3 may be made and considered as part of the process of deciding whether peer to peer communication or infrastructure communication should be used.

Figure 4:
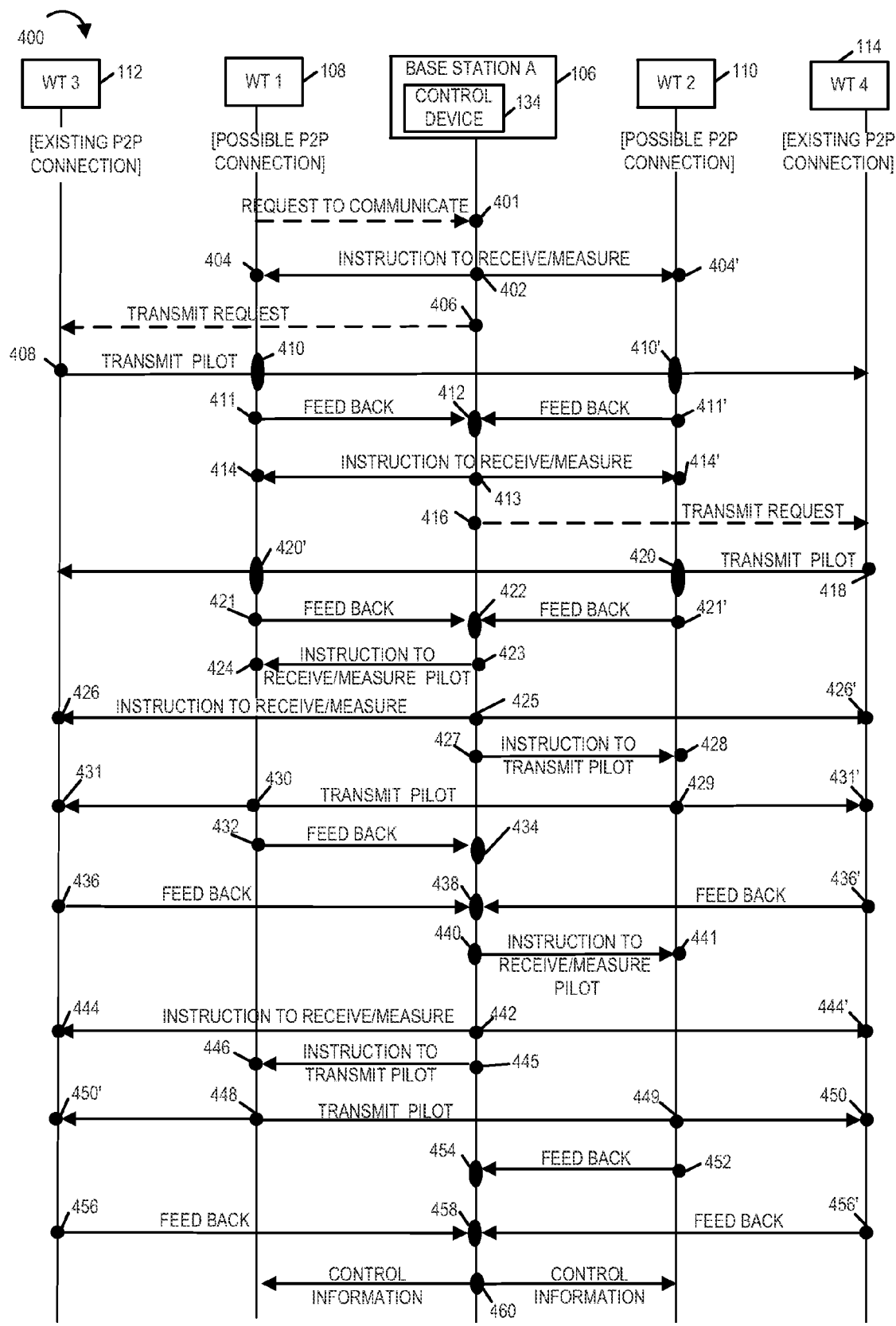
FIG. 4 illustrates various signaling and steps associated with an exemplary embodiment involving more signal and interference measurements than the FIG. 3 exemplary embodiment.

FIG. 4 illustrates various signaling and steps associated with an embodiment 400 involving more signal and interference measurements than the FIG. 3 exemplary embodiment. In the FIG. 4 embodiment signal measurement information is shown being reported back to the control device 134 included in the base station 106 after each signal measurement. It should be appreciated that multiple signal measurements may be made and then the signal measurement information corresponding to multiple signal measurement can be reported as a group or set of information once various measurements have been made. Thus, the interference signal measurement information can be reported in one or more signals depending on the particular embodiment.

The embodiment shown in FIG. 4 will now be described. As should be appreciated, many of the signals and measurements of FIG. 4 are the same as or similar to those shown in FIG. 3. Additional signals and measurement are also used in the FIG. 4 embodiment to provide additional information useful for estimating interference to existing connections and/or the connection being established. The exemplary embodiment of FIG. 4 will now be discussed in detail.

In step 401 the base station 106 receives a request from WT 1 108 (or WT 2 110) indicating that the WT 1 108 and WT 2 110 seek to communicate. However the step of receiving the request to communicate is optional as discussed earlier with regard to FIG. 3. In step 402 the base station 106 sends control signals to WT 1 108 and WT 2 110 instructing the wireless terminals to measure a first signal, e.g., a pilot signal, from the WT 3 112 having an existing peer to peer connection with the WT 4 114. The control signals sent by the base station 106 may be sent individually to WT 1 108 and WT 2 110. WT 1 108 and WT 2 110 receive the control signals in processing steps 404 and 404' respectively and wait to receive the first pilot signal.

In step 406 the base station 106 optionally sends a control signal to WT 3 112 requesting WT 3 112 to transmit a pilot signal, i.e., the first pilot signal so that WT 1 108 and WT 2 110 can measure the interference caused by WT 3 112. In step 408 the WT 3 112 transmits the first pilot signal. Following the transmission of the pilot signal from the WT 3 112, in steps 410, 410' the first and second wireless terminals WT 1 108, WT 2 110, which are listening for the first pilot signal, perform measurements on the first pilot signal, e.g., signal power level measurement. The signal measurements performed on the pilot signal from WT 3 112 can be used to estimate the cross interference caused by WT 3 112 to the possible peer to peer link between WT 1 108 and WT 2 110. The signal measurements may be, and in some embodiments are, temporarily stored by WT 1 108 and WT 2 110 for sending to the base station 106 (control device 134). In the event when the base station 106 does not specifically request WT 3 112 to transmit the pilot signal, the wireless terminals WT 1 108, WT 2 110 may simply monitor the data channel used by the WT 3 112 and WT 4 114 to perform signal measurement on data signals transmitted by WT 3 112.

Having performed signal measurements on the first pilot signal, the wireless terminals WT 1 108, WT 2 110 in steps 411 and 411' respectively send individual feedback reports to the base station 106. The feedback reports include the signal measurements made individually by WT 1 108 and WT 2 110 on the first pilot signal transmitted by the third wireless terminal WT 3 112. In some embodiments the feedback report includes the interference estimates generated using the signal measurements performed by WT 1 108 and WT 2 110, or may simply include the signal measurements using which the interference estimates can be generated by the control device 134 receiving the signal measurements. The base station 106 receives the feedback report from the wireless terminals in step 412.

In step 413 the base station sends control signals to WT 1 108 and WT 2 110 instructing the wireless terminals to measure a signal, e.g., a pilot signal, from the WT 4 114 having an existing peer to peer connection with the WT 3 112. WT 1 108 and WT 2 110 receive the control signals in processing steps 414 and 414' respectively and wait to receive the pilot signal transmitted by WT 4 114. In step 416 the base station 106 optionally sends a control signal to WT 4 114 requesting WT 4 114 to transmit a pilot signal so that WT 1 108 and WT 2 110 can measure the interference caused by WT 4 114. In step 418, WT 4 114 transmits the pilot signal. Following the transmission of the pilot signal from the WT 4 114, in steps 420', 420 the first and second wireless terminals WT 1 108, WT 2 110 which are monitoring for the pilot signal from WT 4 114 receive and perform measurements on the pilot signal. The signal measurements may be, and in some embodiments are, stored by WT 1 108 and WT 2 110 for sending to the base station 106. Further, in some embodiments by performing inverse power scaling operation the WT 1 108 and WT 2 110 can also determine the interference that they may cause to the wireless terminals WT 3 112 and WT 4 114 which are communicating using an existing peer to peer connection. This determined interference estimate, that may be caused to the WT 3 112 and WT 4 114 may, and in some embodiments is, stored along with the signal measurement information for sending to the base station 106 (control device 134).

Following the signal measurements on the pilot signal from WT 4 114, the wireless terminals WT 1 108, WT 2 110 in steps 421 and 421' respectively send individual feedback reports including the signal measurements made individually by WT 1 108 and WT 2 110 on the pilot signal from WT 4 114, to the base station 106. The base station 106 receives the signal measurements relating to the pilot signal transmitted by WT 4 114, from the wireless terminals in step 422.

In step 423 the base station 106 sends a control signal to the first wireless terminal WT 1 108 instructing WT 1 108 to measure a signal, e.g., a pilot signal, from the second wireless terminal WT 2 110. The control signal is received by WT 1 108 in step 424. In step 425 the base station sends control signals to WT 3 112 and WT 4 114 instructing the wireless terminals to measure the pilot signal from the second wireless terminal WT 2 110. WT 3 112 and WT 4 114 receive the control signals in processing steps 426 and 426' respectively and start monitoring to receive the pilot signal transmitted by WT 2 110.

In step 427 the base station 106 sends a control signal to the second wireless terminal WT 2 110 to transmit a pilot signal so that WT 1 108 can perform signal measurement and estimate peer to peer link quality. Wireless terminals WT 3 112 and WT 4 114 monitor to receive the pilot signal so that they can perform signal measurement to generate an estimate of the interference that may be caused to them if WT 1 108 and WT 2 110 were to communicate in peer to peer mode. In step 429 the second wireless terminal WT 2 110 transmits the pilot signal. The first wireless terminal WT 1 108 receives the pilot signal from WT 2 110 and performs signal measurements in step 430. Wireless terminals WT 3 112 and WT 4 114 receive the pilot signal and perform measurements in step 431 and 431' respectively.

In steps 432 the first wireless terminal WT 1 108 send individual feedback report including the signal measurements performed on the pilot signal from WT 2 110, to the base station 106. The base station 106 receives the signal measurements relating to the pilot signal transmitted by WT 2 110, from the wireless terminal WT 1 108 in step 434. In steps 436 and 436' the wireless terminals WT 3 112 and WT 4 114 respectively send individual feedback reports including the signal measurements made individually by WT 3 112 and WT 4 114 from the pilot signal transmitted by WT 2 110, to the base station 106. The feedback report in some embodiments includes interference estimates generated using the signal measurements performed by WT 3 112 and WT 4 114. The base station 106 receives the feedback reports from the wireless terminals WT 3 112 and WT 4 114 in step 438.

In step 440 the base station 106 sends a control signal to the second wireless terminal WT 2 110 instructing WT 2 110 to measure a signal, e.g., a pilot signal, from the first wireless terminal WT 1 108. The control signal is received by WT 2 110 in step 441. In step 442 the base station sends control signals to WT 3 112 and WT 4 114 instructing the wireless terminals to measure the pilot signal from the first wireless terminal WT 1 108. WT 3 112 and WT 4 114 receive the control signals in processing steps 444 and 444' respectively and start monitoring to receive the pilot signal transmitted by WT 1 108.

In step 445 the base station 106 sends a control signal to the first wireless terminal WT 1 108 to transmit a pilot signal so that WT 2 110 can perform signal measurements. Wireless terminals WT 3 112 and WT 4 114 monitor to receive the pilot signal from WT 1 108 so that they can perform signal measurement to generate an estimate of the interference that may be caused to them if WT 1 108 and WT 2 110 were to communicate in peer to peer mode. In step 448 the first wireless terminal WT 1 108 transmits the pilot signal. The second wireless terminal WT 2 110 receives the pilot signal from WT 1 108 and performs signal measurements in step 449. Wireless terminals WT 3 112 and WT 4 114 receive the pilot signal and perform measurements in steps 450' and 450 respectively.

In steps 452 the second wireless terminal WT 2 110 send a feedback report including the signal measurements performed on the pilot signal from WT 1 108, to the base station 106. The base station 106 receives the signal measurements relating to the pilot signal transmitted by WT 1 108, from the wireless terminal WT 2 110 in step 454.

In steps 456 and 456' the wireless terminals WT 3 112 and WT 4 114 respectively send individual feedback reports including the signal measurements made individually by WT 3 112 and WT 4 114 from the pilot signal transmitted by WT 1 108, to the base station 106. The base station 106 receives the feedback reports from the wireless terminals WT 3 112 and WT 4 114 in step 458.

Following the receipt of various feedback reports, in step 458 the base station 106 (control device 134) makes a decision as to whether the first and second wireless terminals WT 1 108 and WT 2 110 should communicate using a peer to peer connection or via the infrastructure base station 106, based on the signal measurement information and/or the interference estimates received in the feedback reports. In some embodiments the feedback reports are forwarded to the control node 130, e.g., as in FIG. 1 example, to make the decision whether the communications devices should communicate using a peer to peer connection or via one or more intermediate base stations. After the decision has been made, in step 460 the base station 106 sends control information to the first and second wireless terminals WT 1 108 and WT 2 110, indicating whether they should communicate using direct peer to peer communications or via the base station 106.

It should be appreciated in some embodiments where intercell communications occur, i.e., when devices seeking to communicate are in nearby cells each with a separate base station serving the respective cell, then feedback reports are forwarded from the respective base stations of each cell to the control node 130 which makes the decision.

While some examples discussed above have been used to describe various features, the method used in some embodiments will become even clearer when considered in view of the flow chart shown in FIG. 5.

Figure 5B:
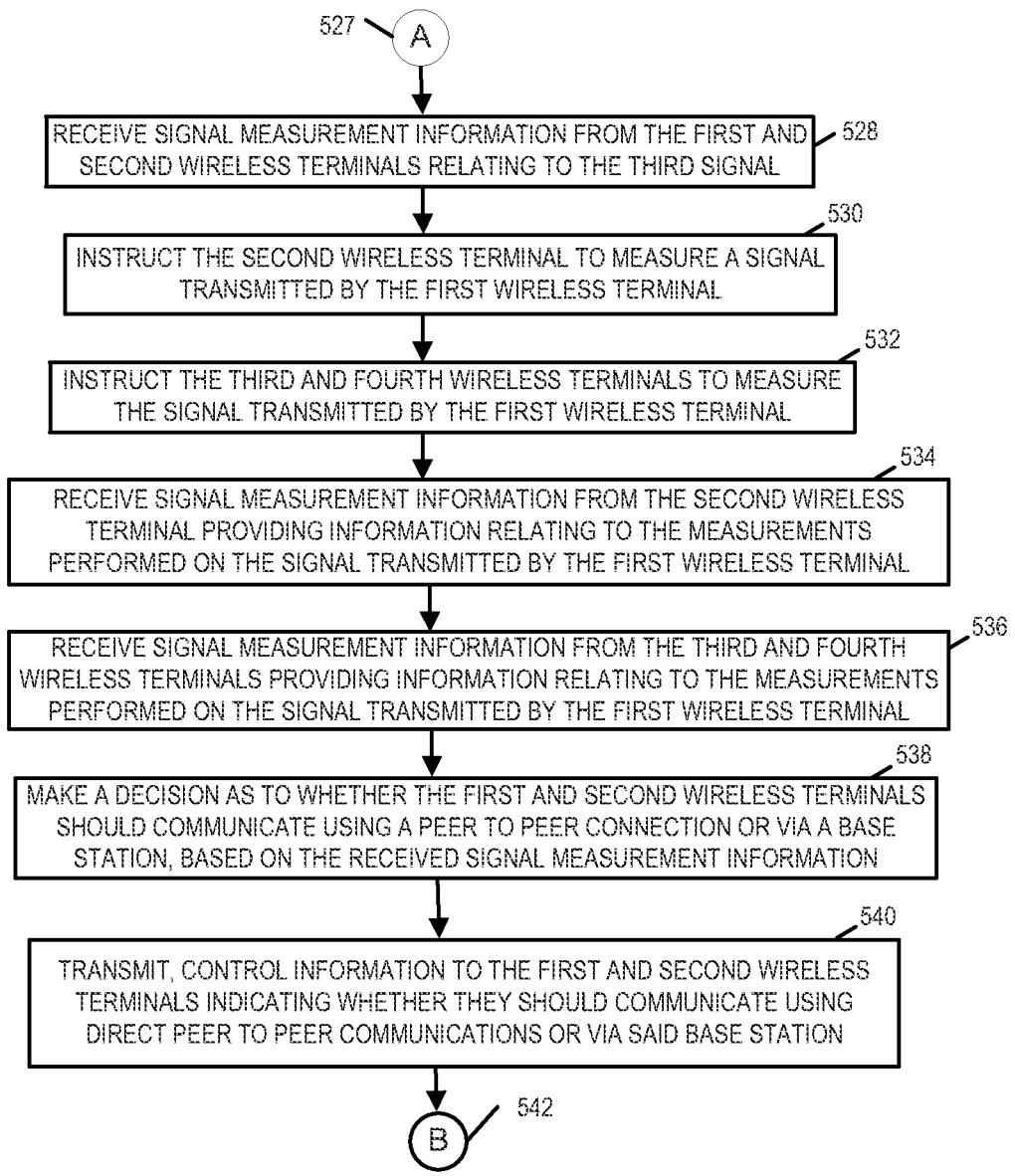
FIG. 5B, which in combination with FIG. 5A comprises

FIG. 5, which comprises the combination of FIGS. 5A and 5B, is a flowchart 500 showing the steps of an exemplary method of operating a control device, in accordance with an exemplary embodiment. In some embodiments the control device is one of a base station, e.g., such as base station 106, or a mobility management entity such as the control node 130 shown in FIG. 1. For the purposes of discussion consider that the control device 134 included in the base station 106 controls the base station 106 to implement the method of flowchart 500. To facilitate better understanding of the method of flowchart 500, reference to FIGS. 1-3 may be made.

As shown in FIG. 5A, operation starts in step 502. In step 502 the control device 134 is powered on, initialized and begins monitoring for messages and/or other signals. Each of the arrows extending out of step 502 corresponds to a processing path associated with a different type of signal or information which may be received. Thus, operation proceeds from start step 502 along two parallel paths, to steps 503 and 504 respectively. In some embodiments steps 503 and 504 may occur asynchronously, e.g., in parallel. In step 503 the control device 134 (base station 106) receives network information which provides information regarding the configuration of the network 100 and base station loading information for the base stations serving different cells in the network 100, e.g., cell 102, 104. The operation proceeds from step 503 to step 505 where the received network information is stored, e.g., in a memory. Network information may further include, e.g., sectorization and frequency band usage information, information regarding number of mobile devices communicating using peer to peer communications etc. Operation proceeds from step 505 back to step 503 where the control device 134 waits to receive further updates, e.g., regarding changes in base station loading conditions, number devices communicating using direct peer to peer links etc. The network information may be updated in response to changes in the system such as the addition or elimination of a base station, change in number of mobile devices communicating using a peer to peer connection, handoff of mobile devices from one base station to another leading to changes in the loading conditions of a given base station etc. Network information is stored and may be used, e.g., in making decisions regarding whether one or more devices should communicate using peer to peer communications or via one or more intermediate base station at a given time.

In step 504 the control device 134 receives an indication that a first wireless terminal WT 1 108 and a second wireless terminal WT 2 110 seek to communicate. Step 504 is optional and may be skipped in some embodiments. In some embodiments where step 504 does not occur, the control device 134 starts the exemplary method 500 and steps 506 through 540 are performed. In some embodiments the control device 134 decides to perform steps 506 through 540 to reduce the loading at base station 106 when there is a good opportunity for one or more devices which are communicating via the base station 106 (e.g., WT 1 108 and WT 2 110) to communicate directly via a peer to peer communications link and thus reduce the burden on the serving intermediate base station 106. This way some WWAN traffic can be off-loaded to direct peer to peer communications links.

Operation proceeds from step 504 to step 506. In step 506 the control device 134 instructs the first wireless terminal WT 1 102 to measure a first signal from a third wireless terminal, e.g., WT 3 112, the third wireless terminal having an existing peer to peer connection with a fourth wireless terminal, e.g., WT 4 114. In various embodiments the first signal is e.g., a pilot signal, which gives an indication of the amount of power used by the WT 3 112 to transmit traffic data and thus by performing signal measurements on the first signal from WT 3 112, the first wireless terminal WT 1 108 can estimate the interference which may be caused to WT 1 108, by WT 3 112 during data transmission.

Operation proceeds from step 506 to step 508. In step 508 the control device 134 sends a control signal to the second wireless terminal WT 2 110 instructing it to measure the first signal from WT 3 112. Operation proceeds from step 508 to step 510 wherein the control device 134 sends a control signal to the third wireless terminal WT 3 112 instructing WT 3 112 to transmit the first signal, i.e., for which the first and second wireless terminals are instructed to monitor for and measure.

Operation proceeds from step 510 to step 512. In step 512 the control device 134 receives signal measurement information from the first wireless terminal WT 1 108 providing information relating to the first signal, e.g., information regarding signal measurements performed by WT 1 108 on the first signal from WT 3 112. The operation proceeds from step 512 to step 514. In step 514 the control device 134 receives signal measurement information from the second wireless terminal WT 2 110 relating to the first signal. Thus the second wireless terminal WT 2 110 also provides signal measurement information corresponding to the first signal from WT 3 112, which provides information about the cross interference that may be caused by the third wireless terminal WT 3 112 to WT 2 110, during data transmission from WT 3 112.

Operation proceeds from step 514 to step 516. In step 516 the control device 134 instructs the first wireless terminal WT 1 108 to measure a second signal transmitted by the second wireless terminal WT 2 110 with which the first wireless terminal WT 1 108 seeks to communicate. In some embodiments the second signal transmitted by the WT 2 110 is a pilot signal and is used by WT 1 108 to perform signal measurements that will provide a measure of the quality of a possible peer to peer link between WT 1 108 and WT 2 110. Operation proceeds from step 516 to step 518. In step 518 the control device 134 instructs the third and fourth wireless terminals WT 3 112 and WT 4 114 to measure the second signal from WT 2 110.

Operation proceeds from step 518 to step 520. In step 520 the control device 134 receives signal measurement information from the first wireless terminal WT 1 108 providing information relating to the second signal. Operation proceeds from step 520 to step 522. In step 522 the control device receives signal measurement information from the third and fourth wireless terminals WT 3 112 and WT 4 114 providing information relating to the second signal. The signal measurements performed by WT 3 112 and WT 4 114 on the second signals can, and sometimes are, used to generate an estimate of the interference that will be caused to the existing peer to peer connection between WT 3 112 and WT 4 114 if WT 1 108 and WT 2 110 were to communicate in peer to peer mode.

Operation proceeds from step 522 to step 524. In step 524 the control device 134 instructs the first and second wireless terminals WT 1 108 and WT 2 110 to measure a third signal, the third signal being a signal, e.g., a pilot, from the fourth wireless terminal WT 4 114. Following the receipt of instructions from the control device 134, the first and second wireless terminals monitor for the third signal from WT 4 114, to perform signal measurements. Operation proceeds from step 524 to step 526 wherein the control device 134 sends a control signal to the fourth wireless terminal instructing WT 4 114 to transmit the third signal. In some embodiments the third signal is a pilot signal from WT 4 114. Step 526 is optional and in some embodiments no control signal to WT 4 114 from the control device 134 is needed. In some cases WT 1 108 and WT 2 110 monitor the channel over which signals, e.g., pilot signals, data signals etc., are transmitted by devices communicating using peer to peer communications and perform the signal measurement when a pilot signal, or another signal such as a data traffic signal, is detected. In some embodiments the control device 134 instructs the second, third and fourth wireless terminals WT 2 110, WT 3 112, and WT 4 114 when to transmit the pilots signals and what frequency(s) to transmit the pilot signals on.

Operation proceeds from step 526 to step 528 via connecting node A 527. In step 528 the control device 134 receives signal measurement information from the first and second wireless terminals WT 1 108 and WT 2 110 relating to the third signal from WT 4 114. The signal measurement information provides an indication of the cross interference that may be caused to WT 1 108 and WT 2 110 due to transmissions from WT 4 114. Operation proceeds from step 528 to step 530.

In step 530 the control device 134 instructs the second wireless terminal WT 2 110 to measure a signal, e.g., a pilot signal, transmitted by the first wireless terminal WT 1 108 with which the second wireless terminal WT 2 110 seeks to communicate. The operation proceeds from step 530 to step 532 wherein the control device 134 instructs the third and fourth wireless terminals WT 3 112 and WT 4 114 to measure the signal transmitted by the first wireless terminal WT 1 108. It should be appreciated that the signal measurements performed by WT 3 112 and WT 4 114 on the signal from WT 1 108 provides an indication of the interference that may be caused to the existing communications link between WT 3 112 and WT 4 114 from transmissions by the first wireless terminal WT 1 108. In some embodiments the control device 134 instructs the first wireless terminal WT 1 108 when to transmit the pilot signal and what frequency(s) to transmit said pilot signal on.

Operation proceeds from step 532 to step 534. In step 534 the control device receives signal measurement information from the second wireless terminal WT 2 110 providing information relating to the measurements performed on the signal transmitted by the first wireless terminal WT 1 108. The signal transmitted by WT 1 108 in some embodiments is a pilot signal and the signal measurements performed by WT 2 110 on this signal provide a measure of the quality of the possible peer to peer link between WT 1 108 and WT 2 110. The operation proceeds from step 534 to step 536. In step 536 the control device 134 receives signal measurement information from the third and fourth wireless terminals WT 3 112 and WT 4 114 providing information relating to the measurements performed on the signal transmitted by the first wireless terminal WT 1 108.

Following the receipt of signal measurements from the various wireless terminals in the steps discussed above, in step 538 the control device 134 makes a decision as to whether the first and second wireless terminals WT 1 108 and WT 2 110 should communicate using a peer to peer connection or via a base station based on the received signal measurement information (e.g., signal measurement information received in at least one of the steps 512, 514, 520, 522, 528, 534, and 536). In some embodiments the decision regarding how WT 1 108 and WT 2 110 should communicate is based on at least the signal measurement information received from the first wireless terminal WT 1 108 relating to the first signal, and the signal measurement information relating to the second signal from WT 2 110. In some but not necessarily all embodiments the decision as to whether the first and second wireless terminals WT 1 108 and WT 2 110 should communicate using a peer to peer connection or via a base station is further based on the signal measurement information received from the second wireless terminal WT 2 110 relating to the first signal. In some embodiments the decision as to whether the first and second wireless terminals WT 1 108 and WT 2 110 should communicate using a peer to peer connection or via a base station is further based on the signal measurement information received from the first and second wireless terminals WT 1 108 and WT 2 110 relating to the third signal (as discussed in step 528). In some embodiments the decision made by the control device 134 is further based on the signal measurement information, received from the third and fourth wireless terminals, relating to the second signal transmitted by WT 2 110.

In various embodiments the decision made by the control device 134 depends on what the feedbacks, e.g., the signal measurement reports, from the wireless terminals indicate. For example, in some embodiments if the signal measurements show that potentially a strong interference may be caused from WT 3 112 and WT 4 114, to WT 1 108 and WT 2 110 if they communicate using possible peer to peer link, and/or when the channel quality of the possible new peer to peer link between WT 1 108 and WT 2 110 is below a predetermined threshold level, then the control device 134 would direct WT 1 108 and WT 2 110 to communicate via the base station 106. In some embodiments the base station loading conditions at base station 106 also affect the decision making process.

In some embodiments when the received signal measurements indicate that the channel quality of the possible new peer to peer link between WT 1 108 and WT 2 110 is good, e.g., above a predetermined threshold level, and/or when cross interference that may be caused from WT 3 112 and WT 4 114 to WT 1 108 and WT 2 110 communications is low, then the control device 134 directs WT 1 108 and WT 2 110 to communicate via peer to peer communications.

Operation proceeds from step 538 to step 540. In step 540 the control device 134 transmits control information to the first and second wireless terminals WT 1 108 and WT 2 110 indicating whether they should communicate using direct peer to peer communications or via the base station 106. Based on the received control information from the control device 134, WT 1 108 and WT 110 proceed to communicate using the indicated mode of communications. Operation proceeds step 540 back to step 504 (via connecting node B 542) and the base station 106 including the control device 134 monitors to receive communications request from one or more devices in the network 100.

In various embodiments measuring a signal includes measuring the strength of a received signal. For example, as discussed above in one embodiment when instructed by the control device 134, wireless terminals WT 1 108, WT 2 110 measure the signal strength of a signal from WT 3 112 and WT 4 114 which, from the perspective of wireless terminals WT 1 108 and WT 2 110, is interference from the neighboring wireless devices due to transmissions by WT 3 112 and WT 4 114. The received signal strength of the signal, e.g., pilot signal, transmitted at, e.g., a known power level, can be used to predict interference which will be caused by transmission by WT 3 112 and WT 4 114 at other power levels, e.g., power levels expected for peer to peer or infrastructure mode transmissions. Such measured values and/or reports represent interference information which can be used by the control device 134 in generating interference cost estimates.

Figure 6:
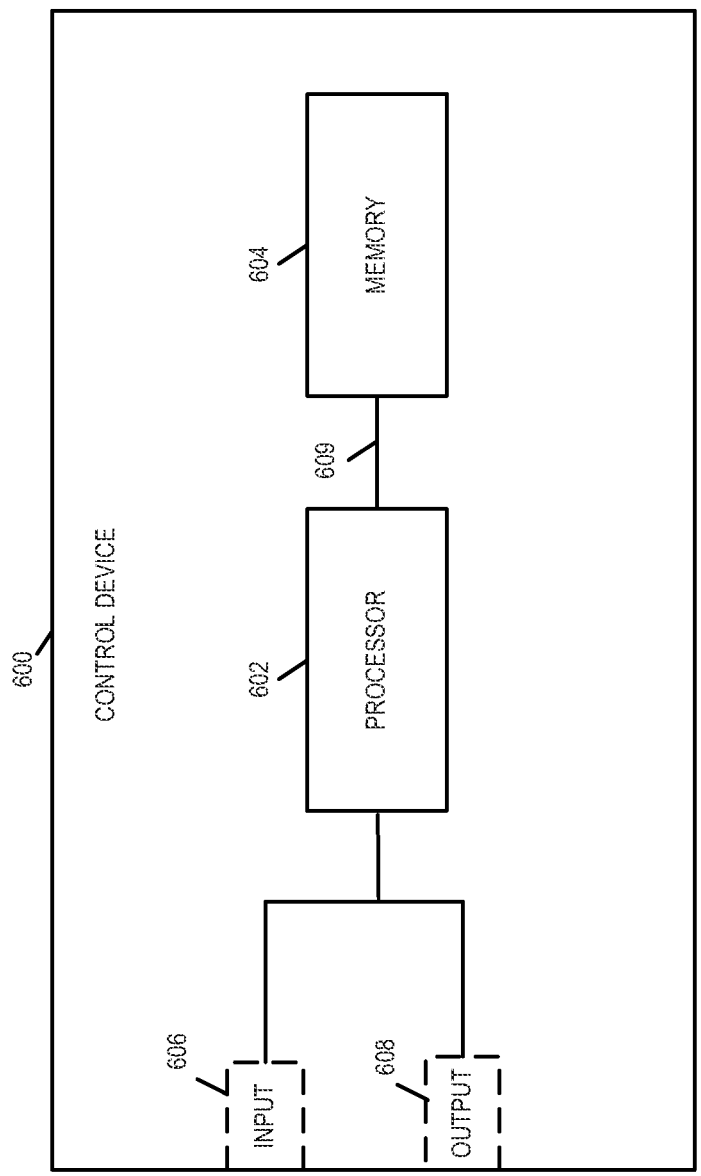
FIG. 6 illustrates an exemplary control device which can be used in the control node or as part of any one of the base stations shown in the exemplary system shown in FIG. 1.

FIG. 6 is a drawing of an exemplary control device 600, in accordance with one exemplary embodiment. Control device 600 can be implemented as part of the control node 130; the base station 106; and the base station 120, shown in FIG. 1. In some embodiments control device 600 is the device implementing a method in accordance with flowchart 500 of FIG. 5, and is one of a base station and mobility management entity. Control device 600 includes a processor 602 and memory 604 coupled together via a bus 609 over which the various elements (602, 604) may interchange data and information. Control device 600 further includes an input module 606 and an output module 608 which may be coupled to the processor 602 as shown. However, in some embodiments the input module and output module 606, 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output. In cases where the control device 600 is part of a node such as the base station, the memory 604 may also include one or more base station control routines used to support wireless terminal communications and/or other base station functions. When the control device 600 is included in a control node, e.g., control node 130, the memory 604 may also include one or more control routines used to control and/or manage one or more communications devices including base stations.

Processor 602, in some embodiments, is configured to: instruct a first wireless terminal, e.g., WT 1 108, to measure a first signal from a third wireless terminal, e.g., WT 3 112, having an existing peer to peer connection with a fourth wireless terminal, e.g., WT 4 114; instruct said first wireless terminal to measure a second signal transmitted by a second wireless terminal, e.g., WT 2 110, with which said first wireless terminal seeks to communicate; receive signal measurement information from said first wireless terminal providing information relating to said first and second signals; and make a decision as to whether said first and second wireless terminals should communicate using a peer to peer connection or via a base station based on said received signal measurement information relating to said first and second signals.

In some embodiments the first and second signals are pilot signals. In some embodiments the first and second signals provide an indication of the amount of power used to transmit data. Thus by measuring signal strength of the first signal from WT 3 112 an amount of interference which will be caused during data transmission from WT 3 112 can be predicted, and by measuring the second signal from WT 2 110 quality of the channel between WT 1 108 and WT 2 110 can be estimated.

In some embodiments the processor 602 is configured to receive an indication, e.g., a request to communicate, that first and second wireless terminals WT 1 108, WT 2 110 are seeking to communicate. In some embodiments the request to communicate is received prior to instructing the first wireless terminal to measure said first signal. In some embodiments the processor 602 is further configured to instruct the third wireless terminal WT 3 112 to transmit said first signal.

Processor 602 is further configured to instruct said second wireless terminal WT 2 110 to measure said first signal; and receive signal measurement information from said second wireless terminal relating to said first signal. In some embodiments the processor 602 is further configured to make said decision as to whether said first and second wireless terminals should communicate using a peer to peer connection or via a base station, further based on said received signal measurement information relating to said first signal from the second wireless terminal WT 2 110.

Processor 602 in some embodiments, is further configured to instruct the first and second wireless terminals to measure a third signal from the fourth wireless terminal; and receive signal measurement information from said first and second wireless terminals WT 1 108, WT 2 110 relating to said third signal. In some embodiments the processor 602 is further configured to instruct the fourth wireless terminal WT 4 114 to transmit said third signal. In some embodiments the third signal is a pilot signal from the fourth wireless terminal. In some embodiments processor 602 is further configured to make the decision as to whether said first and second wireless terminals should communicate using a peer to peer connection or via a base station, further based on said received signal measurement information relating to said third signal. In some embodiments processor 602 is further configured to instruct the second, third and fourth wireless terminals (e.g., WT 2 110, WT 3 112, and WT 4 114) when to transmit the pilots signals and what frequency(s) to transmit the pilot signals on.

Processor 602 is further configured to transmit control information to said first and second wireless terminals indicating whether they should communicate using direct peer to peer communications or via said base station. In various embodiments the processor 602 is further configured to instruct said first, second, third and fourth wireless terminals WT 1 108, WT 2 110, WT 3 112, WT 4 114 when to transmit said signals and what frequency(s) to transmit said signals on and the time at which said signals are to be transmitted.

In one embodiment the control device 600 is configured to implement various steps shown in FIG. 4 example. Thus in such an embodiment the processor 602 is configured to: send various instructions to the wireless terminals WT 1 108, WT 2 110, WT 3 112 discussed in the FIG. 4 embodiment, and WT 4 114; receive signal measurement information from the wireless terminals; make a decision as to whether two or more wireless terminals, e.g., WT 1 108 and WT 2 110, seeking to communicate should communicate using a peer to peer connection or via a base station based on the signal measurement information; and transmit the control information to the wireless terminals seeking to communicate indicating whether they should communicate using direct peer to peer communications or via said base station, as discussed with regard to FIG. 4 embodiment.

Figure 7A:
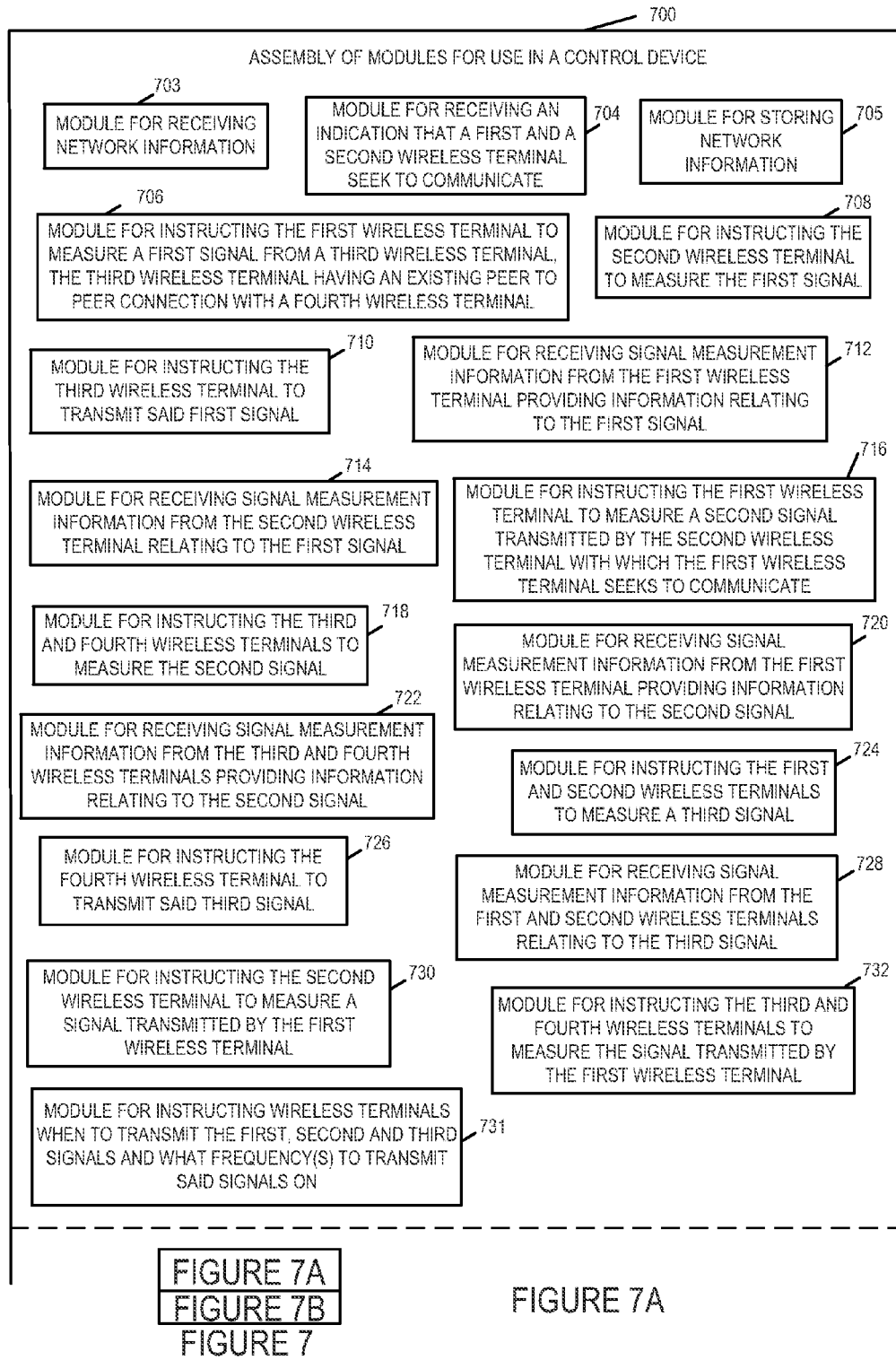
FIG. 7 which comprises the combination of FIGS. 7A and 7B illustrates an assembly of modules which can be used in the exemplary control device shown in FIG. 6.
Figure 7B:
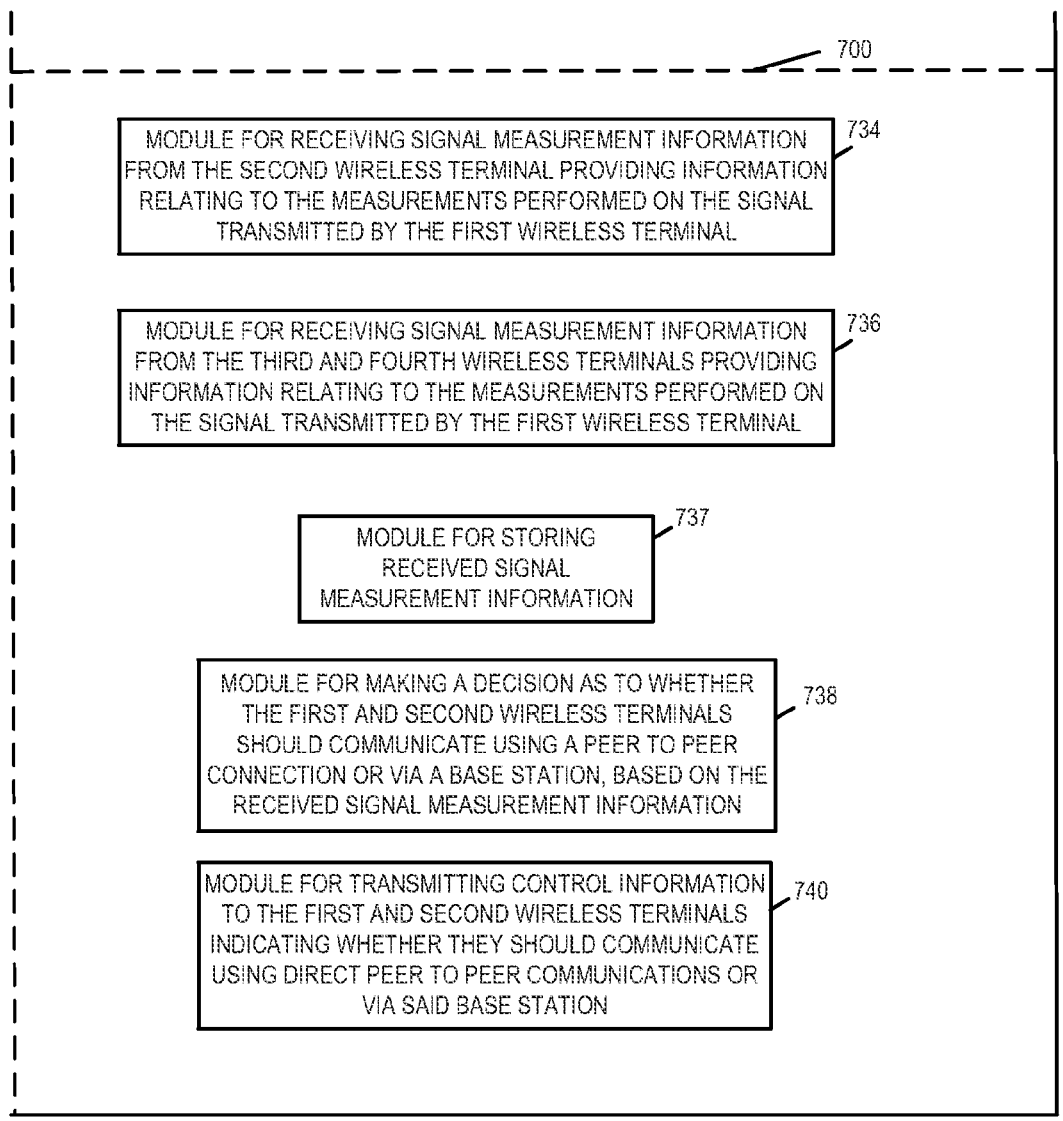

FIG. 7 which comprises the combination of FIGS. 7A and 7B illustrates an assembly of modules 700 which can, and in some embodiments is, used in the control device, e.g., device 600, illustrated in FIG. 6. The modules in the assembly 700 can be implemented in hardware within the processor 602 of FIG. 6, e.g., as individual circuits. Alternatively, the modules may be implemented in software and stored in the memory 604 of the control device 600 shown in FIG. 6. While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 502, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the control device 600 or elements therein such as the processor 602, to perform the functions of the corresponding steps illustrated in the method flow chart 500 of FIG. 5.

The assembly of modules 700 includes a module corresponding to each step of the method shown in FIG. 5. The module in FIG. 7 which performs or controls the processor 602 to perform a corresponding step shown in FIG. 5 is identified with a number beginning with a 7 instead of beginning with 5. For example module 704 corresponds to step 504 and is responsible for performing the operation described with regard to step 504. As illustrated in FIG. 7, the assembly of modules 700 includes a module 703 for receiving network information, a module 705 for storing the network information, a module 704 for receiving an indication that a first and a second wireless terminal seek to communicate, a module 706 for instructing the first wireless terminal to measure a first signal from a third wireless terminal having an existing peer to peer connection with a fourth wireless terminal and a module 708 for instructing the second wireless terminal to measure the first signal.

The assembly of modules 700 further includes a module 710 for instructing the third wireless terminal to transmit the first signal, a module 712 for receiving signal measurement information from the first wireless terminal providing information relating to the first signal, a module 714 for receiving signal measurement information from the second wireless terminal providing information relating to the first signal. In some embodiments the first signal is e.g., a pilot signal from the third wireless terminal. The assembly of modules 700 further includes a module 716 for instructing the first wireless terminal to measure a second signal transmitted by the second wireless terminal with which the first wireless terminal seeks to communicate, a module 718 for instructing the third and fourth wireless terminals to measure the second signal, a module 720 for receiving signal measurement information from the first wireless terminal providing information relating to the second signal, and a module 722 for receiving signal measurement information from the third and fourth wireless terminals providing information relating to the second signal. In various embodiments the second signal is, e.g., a pilot signal.

In some embodiments the assembly of modules 700 further includes a module 724 for instructing the first and second wireless terminals to measure a third signal transmitted from the fourth wireless terminal, a module 726 for instructing the fourth wireless terminal to transmit the third signal, a module 728 for receiving signal measurement information from the first and second wireless terminals relating to the third signal.

Assembly of modules 700 further includes a module 730 for instructing the second wireless terminal to measure a signal transmitted by the first wireless terminal, a module 732 for instructing the third and fourth wireless terminals to measure the signal transmitted by the first wireless terminal, a module 734 for receiving signal measurement information from the second wireless terminal providing information relating to the measurements performed on the signal transmitted by the first wireless terminal, and a module 736 for receiving signal measurement information from the third and fourth wireless terminals providing information relating to the measurements performed on the signal transmitted by the first wireless terminal and a module 737 for storing received signal measurement information. The assembly of modules 700 further includes a module 738 for making a decision as to whether the first and second wireless terminals should communicate using a peer to peer connections or via a base station, based on the received signal measurement information, and a module 740 for transmitting control information to the first and second wireless terminals indicating whether they should communicate using direct peer to peer communications or via the base station. In some embodiments the assembly of modules 700 further includes a module 731 for instructing the second, third and fourth wireless terminals when to transmit the pilot signals and what frequency(s) to transmit said pilot signals on. In some embodiments the module 731 is also for instructing various wireless terminals in the system when to transmit signals and what frequency(s) to transmit said signals on, e.g., signals which help the control device 700 to determine a suitable communications mode for wireless terminals. In various embodiments the decision module 740 makes the decision using signal measurement information input received from at least one of the modules 712, 714, 720, 722, 728, 734, and 736.

For the above discussion it should be appreciated that numerous variations and embodiments are possible.

The techniques of various embodiments may be implemented using software, hardware and/or a combination of software and hardware. Various embodiments are directed to apparatus, e.g., control node, mobile nodes such as mobile terminals, base stations, communications system. Various embodiments are also directed to methods, e.g., method of controlling and/or operating a control node, mobile nodes, base stations and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, processing, decision making and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., control node, including a processor configured to implement one, multiple or all of the steps of one or more methods of the invention.

In some embodiments, the processor or processors, e.g., CPUs, of one or more devices, e.g., communications nodes such as a control node, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., control node, includes a module corresponding to each of the steps of the various described methods performed by the device in which the processor is included. The modules may be implemented using software and/or hardware.

Some embodiments are directed to a computer program product comprising a non-transitory computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, control device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a control device, the method comprising:
   instructing a first wireless terminal to measure a first signal from a third wireless terminal having an existing peer to peer connection with a fourth wireless terminal;
   instructing said first wireless terminal to measure a second signal transmitted by a second wireless terminal with which said first wireless terminal seeks to communicate;
   receiving signal measurement information from said first wireless terminal providing information relating to said first and second signals; and
   making a decision as to whether said first and second wireless terminals should communicate using a peer to peer connection or via a base station based on said received signal measurement information relating to said first and second signals.

2. The method of claim 1, further comprising:
   instructing said second wireless terminal to measure said first signal;
   receiving signal measurement information from said second wireless terminal relating to said first signal; and
   wherein said decision as to whether said first and second wireless terminals should communicate using a peer to peer connection or via a base station is further based on said received signal measurement information relating to said first signal from the second wireless terminal.

3. The method of claim 2, further comprising:
   instructing the first and second wireless terminals to measure a third signal;

receiving signal measurement information from said first and second wireless terminals relating to said third signal; and wherein said decision as to whether said first and second wireless terminals should communicate using a peer to peer connection or via a base station is further based on said received signal measurement information relating to said third signal.

4. The method of claim 1, further comprising:
instructing said third and fourth wireless terminals to measure said second signal;
receiving, from said third and fourth wireless terminals, signal measurement information relating to said second signal; and
wherein said decision as to whether said first and second wireless terminals should communicate using a peer to peer connection or via a base station is further based on said signal measurement information relating to said second signal received from the third and fourth wireless terminals.

5. The method of claim 1, further comprising:
transmitting control information to said first and second wireless terminals indicating whether they should communicate using direct peer to peer communications or via said base station.

6. The method of claim 3, wherein said third signal is a pilot signal; and
wherein said control device instructs said second, third and fourth wireless terminals when to transmit said pilot signals and what frequency(s) to transmit said pilot signals on.

7. A control device comprising:
means for instructing a first wireless terminal to measure a first signal from a third wireless terminal having an existing peer to peer connection with a fourth wireless terminal;
means for instructing said first wireless terminal to measure a second signal transmitted by a second wireless terminal with which said first wireless terminal seeks to communicate;
means for receiving signal measurement information from said first wireless terminal providing information relating to said first and second signals; and
means for making a decision as to whether said first and second wireless terminals should communicate using a peer to peer connection or via a base station based on said received signal measurement information relating to said first and second signals.

8. The control device of claim 7, further comprising:
means for instructing said second wireless terminal to measure said first signal;
means for receiving signal measurement information from said second wireless terminal relating to said first signal; and
wherein said means for making a decision as to whether said first and second wireless terminals should communicate using a peer to peer connection or via a base station, make said decision further based on said received signal measurement information relating to said first signal from the second wireless terminal.

9. The control device of claim 8, further comprising:
means for instructing the first and second wireless terminals to measure a third signal;
means for receiving signal measurement information from said first and second wireless terminals relating to said third signal; and wherein said means for making a decision as to whether said first and second wireless terminals should communicate using a peer to peer connection or via a base station, make said decision further based on said received signal measurement information relating to said third signal.

10. The control device of claim 7, further comprising:
means for transmitting control information to said first and second wireless terminals indicating whether they should communicate using direct peer to peer communications or via said base station.

11. The control device of claim 9, wherein said third signal is a pilot signal; and
wherein said control device further comprises means for instructing said second, third and fourth wireless terminals when to transmit said pilot signals and what frequency(s) to transmit said pilot signals on.

12. A control device comprising:
at least one processor configured to:
instruct a first wireless terminal to measure a first signal from a third wireless terminal having an existing peer to peer connection with a fourth wireless terminal;
instruct said first wireless terminal to measure a second signal transmitted by a second wireless terminal with which said first wireless terminal seeks to communicate;
receive signal measurement information from said first wireless terminal providing information relating to said first and second signals;
make a decision as to whether said first and second wireless terminals should communicate using a peer to peer connection or via a base station based on said received signal measurement information relating to said first and second signals; and
a memory coupled to said at least one processor.

13. The control device of claim 12, wherein said at least one processor is further configured to:
instruct said second wireless terminal to measure said first signal;
receive signal measurement information from second wireless terminal relating to said first signal; and
wherein said decision as to whether said first and second wireless terminals should communicate using a peer to peer connection or via a base station is further based on said received signal measurement information relating to said first signal from the second wireless terminal.

14. The control device of claim 13, wherein said at least one processor is further configured to:
instruct the first and second wireless terminals to measure a third signal;
receive signal measurement information from said first and second wireless terminals relating to said third signal; and
wherein said decision as to whether said first and second wireless terminals should communicate using a peer to peer connection or via a base station is further based on said received signal measurement information relating to said third signal.

15. The control device of claim 14, wherein said at least one processor is further configured to:
instruct fourth wireless terminal to transmit said third signal.

16. The control device of claim 12, wherein said at least one processor is further configured to:

transmit control information to said first and second wireless terminals indicating whether they should communicate using direct peer to peer communications or via said base station.

17. The control device of claim 14, wherein said third signal is a pilot signal; and wherein said at least one processor is further configured to instruct said second, third and fourth wireless terminals when to transmit said pilot signals and what frequency(s) to transmit said pilot signals on.

18. A computer program product for use in a control device, comprising:

a non-transitory computer readable medium comprising:

code for causing at least one computer to instruct a first wireless terminal to measure a first signal from a third wireless terminal having an existing peer to peer connection with a fourth wireless terminal;

code for causing said at least one computer to instruct said first wireless terminal to measure a second signal transmitted by a second wireless terminal with which said first wireless terminal seeks to communicate;

code for causing said at least one computer to receive signal measurement information from said first wireless terminal providing information relating to said first and second signals; and code for causing said at least one computer to make a decision as to whether said first and second wireless terminals should communicate using a peer to peer connection or via a base station based on said received signal measurement information relating to said first and second signals.

19. The computer program product of claim 18, wherein said non-transitory computer readable medium further comprises:

code for causing said at least one computer to instruct said second wireless terminal to measure said first signal;

code for causing said at least one computer to receive signal measurement information from said second wireless terminal relating to said first signal; and wherein said code for causing said at least one computer to make said decision as to whether said first and second wireless terminals should communicate using a peer to peer connection or via a base station, causes said at least one computer to make said decision further based on said received signal measurement information relating to said first signal from the second wireless terminal.

20. The computer program product of claim 19, wherein said non-transitory computer readable medium further comprises:

code for causing said at least one computer to instruct the first and second wireless terminals to measure a third signal;

code for causing said at least one computer to receive signal measurement information from said first and second wireless terminals relating to said third signal; and wherein said code for causing said at least one computer to make said decision as to whether said first and second wireless terminals should communicate using a peer to peer connection or via a base station, causes said at least one computer to make said decision further based on said received signal measurement information relating to said third signal.

* * * * *